United States Patent Office 3,520,930
Patented July 21, 1970

3,520,930
LOWER ALKOXY-AMINO-BENZYLAMINES
Robert L. Clark, Woodbridge, and Edward F. Rogers, Middletown, N.J., assignors to Merck & Co., Inc., Rahway, N.J., a corporation of New Jersey
No Drawing. Filed Dec. 31, 1964, Ser. No. 422,536
Int. Cl. C07c 87/28, 93/14; A01n 9/20
U.S. Cl. 260—570.9                                   4 Claims

ABSTRACT OF THE DISCLOSURE

Anticoccidial 2-alkoxy-4-nitro(amino, alkylamino or acylamino)-benzylamines and benzyl alcohols are prepared by selective reduction techniques from the corresponding 2-loweralkoxy-4-nitro benzoic acid or 2-loweralkoxy-4-nitro benzonitrile. It is contemplated that dosage units of these active coccidiostats will be administered orally in the prevention and control of coccidiosis in poultry.

---

This invention relates to novel chemical compounds. More particularly, it relates to certain 2-alkoxy-4-substituted benzylamine and benzyl alcohol compounds, and with methods of preparing such substances. It relates further to the use of these compounds in the treatment and prevention of the poultry disease coccidiosis, and with poultry feeds, feed additives and feed supplements containing them as active anticoccidial agents.

One object of the present invention is to provide new and novel chemical compounds of the formula.

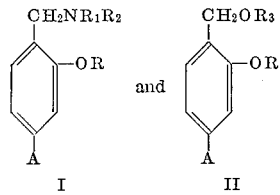

In the above formulas R is a lower alkyl group, and preferably one having 1–5 carbon atoms, such as methyl, ethyl, propyl and amyl; A is a nitro ($NO_2$) or —$NHR_4$ radical, where $R_4$ is hydrogen, loweralkyl such as methyl, ethyl or propyl, lower alkanoyl such as acetyl, propionyl, butyryl and the like, or benzoyl. Thus, in addition to nitro, A may be amino, alkylamino or acylamino. The substituents $R_1$ and $R_2$ in the Formula I above have the same meaning as $R_4$, although $R_1$, $R_2$ and $R_4$ may be the same or different in a specific compound. $R_3$ in structure II represents hydrogen or a lower alkanoyl radical such as acetyl or propionyl. These compounds may for convenience be referred to broadly as 2-alkoxy-4-substituted benzyl alcohols and benzylamines. Certain of these are sufficiently basic to form salts, and the invention also includes the non-toxic acid addition salts of such bases.

As representative of the specific substances provided by this invention, there may be mentioned 2-methoxy-4-nitrobenzyl acetate, 2-ethoxy-4-methyl-amino-benzyl alcohol, N - methyl - 2-methoxy-4-methylamino-benzylamine, 2-methoxy-4-benzamido benzyl alcohol, N-(2-methoxy-4-acetamido-benzyl) propionamide and N-(2-propoxy-4-nitro-benzyl) benzamide.

In many cases the acid addition salts of those compounds which form salts, i.e. the benzylamines and the 4-amino benzyl alcohols, are more highly crystalline and more conveniently handled than the corresponding free bases. For these reasons, it is often preferred to isolate and use them as the salts. Preferred acid addition salts are those of the strong mineral acids such as the hydrochloride, hydrobromide, sulfate and nitrate, although salts of organic acids such as the acetate, citrate, tartrate, oxalate, succinate and the like may be used when the base is sufficiently strong to form such salts. Those salts generally considered as non-toxic are preferred when the compounds are to be used as anticoccidial agents for poultry.

It is a further object of the invention to provide chemical syntheses of these novel benzyl alcohol and benzylamine derivatives. Such processes may be set forth structurally as follows, where R is loweralkyl and X is halo:

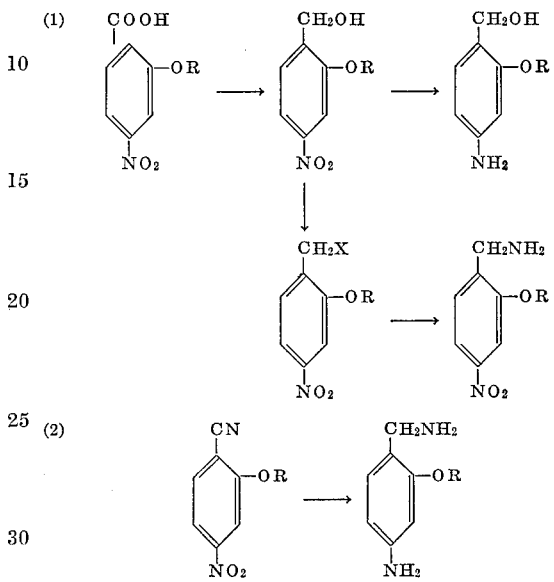

It will be noted that these processes begin with either 2-loweralkoxy-4-nitro benzoic acid or 2-loweralkoxy-4-nitro benzonitrile. Our novel 2-loweralkoxy-4-nitro benzyl alcohols are obtained by the selective reduction of 2-loweralkoxy-4-nitro benzoic acid, and may then be converted to 2-loweralkoxy-4-amino-benzyl alcohol by further selective reduction under the proper reaction conditions.

2-loweralkoxy-4-nitro benzyl alcohol is produced according to our process by treating 2-loweralkoxy-4-nitro benzoic acid with a borohydride reducing agent in the presence of an aluminum halide. It is preferred to use an alkali metal borohydride as the reducing agent, and to carry out the process in a liquid solvent inert under the reaction conditions, and glycol ethers have been found to be very suitable solvent media. The reaction is initiated in the cold, and then completed at elevated temperatures of 50–100° C. Reaction periods of 1–6 hours give satisfactory results, although longer times could be used if desired.

These 2-loweralkoxy-4-nitro benzyl alcohol compounds, in addition to being themselves useful as coccidiostats, also serve as intermediates in our methods for making the 2-loweralkoxy-4-aminobenzyl alcohol and 2-loweralkoxy-4-nitro benzylamine compounds described above. Different reduction conditions must be used depending upon which compound is to be made. 2 loweralkoxy-4-amino benzyl alcohol is produced by hydrogenating the corresponding 4-nitro benzyl alcohol in the presence of a suitable hydrogenation catalyst. A ruthenium catalyst is preferred for this purpose. This reaction also is carried out in a solvent medium, with lower alkanols such as methanol or ethanol being preferred, and is continued at room temperature under superatmospheric hydrogen pressure until the theoretical amount of hydrogen is absorbed. Hydrogenation pressures of 20–60 p.s.i. gives satisfactory results. The desired product is conveniently isolated after removal of the solid catalyst by concentrating the reaction solution essentially to dryness, and crystallizing the solid thus obtained from a suitable organic solvent or solvent mixture.

When 2-loweralkoxy-4-nitro benzylamine is to be formed, the corresponding benzyl alcohol compound is first converted to 2-loweralkoxy-4-nitro benzyl halide by contacting it with a suitable halogenating agent, such as thionyl chloride or thionyl bromide. The halogenation is preferably brought about at temperatures of 15–40° C., and is essentially completed in 1–5 hours. The resulting benzyl halide is then reduced to 2-loweralkoxy-4-nitro benzylamine by treating first with an alkali metal phthalimide to obtain N-(2-loweralkoxy-4-nitro benzyl)-phthalimide, and contacting this latter substance with hydrazine. The first step of this sequence, namely the phthalimide reaction, is brought about by heating 2-loweralkoxy-4-nitro benzyl halide and an alkali metal phthalimide together in a solvent for ½–4 hours at an elevated temperature of 75–115° C. Diloweralkyl alkanamides, such as dimethyl acetamide and dimethylformamide are satisfactory solvents, although the particular solvent is not a critical part of the invention and others inert under the reaction conditions may be used if desired.

The reaction of N-(2-loweralkoxy-4-nitro benzyl) phthalimide with hydrazine is conveniently brought about in a suitable solvent at about room temperature. Lower alkanols such as methanol, ethanol or butanol are satisfactory solvents. At the end of the reaction, the insoluble hydrazide is removed and the 2-loweralkoxy-4-nitro benzylamine recovered from the reaction solution. This is conveniently accomplished by extracting the product into a water-immiscible organic solvent and then removing the solvent by concentration or distillation.

In order to obtain the 2-loweralkoxy-4-amino benzylamines of the invention, 2-loweralkoxy-4-nitro benzonitrile is reductively aminated by contacting it with hydrogen in the presence of ammonia and a hydrogenation catalyst. The reaction is carried out under relatively high pressures of 1000–3000 p.s.i. and at elevated temperatures of from 60–100° C. Lower alkanols are convenient solvent media. For best results a Raney nickel hydrogenation catalyst is used, but it should be understood that other metal hydrogenation catalysts which act similarly to Raney nickel can likewise be used. It is preferred to recover the 2-loweralkoxy-4-amino-benzylamine as an acid addition salt, such as a hydrohalide, by treating the residue obtained on concentration of the finished reaction mixture (after removal of catalyst) with an alcoholic hydrogen halide, such as ethanolic hydrogen chloride, to crystallize the benzylamine salt, and subsequently purifying it if desired by recrystallization from a suitable solvent by techniques known to those skilled in this art.

Also within the purview of this inventon are the N- and O-acyl, and the N-alkyl derivatives of the 2-loweralkoxy-4-A-benzyl alcohol and benzylamine compounds described above, where A represents a nitro or amino radical. The same acylating reagents are employed to accomplish both N- and O-acylation, although somewhat more vigorous reaction conditions are required when the nitrogen atom of the benzylamine is to be acylated. In order to produce the loweralkanoyl or benzoyl compounds of this invention, the 2-loweralkoxy-4-nitro (or amino)-benzyl alcohol or benzylamine is treated with an appropriate acylating agent. The prefered reagents are lower aliphatic acid anhydrides when the lower alkanoyl compounds are to be made, and a benzoyl halide when it is desired to form a benzamido derivative. The reaction is carried out in the presence of an acid binding agent, and for this purpose it is convenient and preferred to employ a liquid organic base such as pyridine, a picoline or quinoline. The amino group present at the 4-position in certain of the compounds of this invention, and the alcoholic —OH group in the substances of Formula II hereinabove are readily acylated by treatment with the acylating system at about room temperature for a few hours. Somewhat more vigorous conditions are desirable for acylation of the benzylamines, and for this purpose it is preferred to heat the acylation reaction mixture to 75–100° C. for from ½–3 hours. The lower alkanoylated and benzoylated substances obtained in this manner may be isolated and purified using techniques known to the art.

In addition to the above, 2-loweralkoxy-4-loweralkylamino benzyl alcohol and benzylamine are encompassed by this invention, as are the 2-loweralkoxy-4-nitro (or amino) benzyl loweralkyl amines. These compounds are prepared from the corresponding amines by treatment with a lower alkylating agent according to known processes. Thus, the 4-amino substituent is alkylated on treatment with a lower alkyl iodide or sulfate such as dimethyl sulfate, methyl iodide or ethyl iodide. The diloweralkylamino compound will be produced when sufficient reagent is used. When 4-mono-loweralkylamino compounds are to be made, it is preferred to alkylate the 4-acetamido (or other loweralkanoyl derivative), and subsequently hydrolyze the acyl radical with a base, such as dilute alkali metal hydroxide. This avoids the formation of mixtures of mono- and di-alkylated amines that are difficult to separate.

An additional object of the present invention is to provide a new and important method of controlling coccidiosis with the substituted benzyl alcohols and benzylamines heretofore described. A still more specific object is a method of controlling coccidial infections due to *E. maxima, E. acervulina* and *E. brunetti* with such compounds. Further objects are to provide poultry feeds and feed supplements containing at least one of these compounds as an active anticoccidial agent.

In accordance with this aspect of our invention, it has been found that these 2-alkoxy-4-nitro (or 4-amino) benzyl alcohol and benzylamine compounds are highly useful in the prevention and control of coccidiosis when they are administered to poultry susceptible to or infected with coccidiosis, either by way of the drinking water or in the feed of the birds. They have a high degree of anticoccidial activity against the *E. maxima, E. brunetti* and *E. acervulina* species of coccidia so that administration of only minor amounts of the drug is necessary for adequate control of the disease.

The amount of compound required for optimal results in treating or preventing coccidiosis will vary depending on the type and severity of the coccidial infection, and on the particular compound used. As a general practice, the anticoccidial compounds of the invention are administered to poultry in the feed at concentrations of about 0.005% to 0.025% by weight of the feedstuff, and drug concentrations of 0.0075% to 0.0175% by weight of feed are normally preferred. Levels of up to about 0.05% by weight of the feed may be used in treating an established outbreak of coccidiosis, although such higher dosages are not preferred for prophylatic treatment where a medicated feed is given continuously to the poultry. It will be appreciated by those skilled in this art that the lowest levels consonant with both adequate control of coccidiosis and the development of immunity are preferred in most instances in order to eliminate as far as possible any side effects that might result from prolonged feeding of unnecessarily high levels of these coccidiostats. The finished feed in which the above-described levels of coccidiostat are employed is a nutritionally adequate one containing sources of carbohydrate, protein, fat, vitamins, minerals and other nutritional factors commonly employed in commercial poultry raising.

In addition to administration by way of the solid feedstuff, the compounds of the invention may be given to poultry in the drinking water of the birds. The preferred dose levels in the drinking water are usually somewhat less than those employed in a solid feed since poultry drink about twice as much as they eat. Administration via the drinking water is of advantage when using the compounds therapeutically rather than prophylactically. For this purpose it is convenient to prepare dispersible or water-soluble powders in which the coccidiostat is intimately dispersed in a suitable water-soluble or dispersible carrier such as dextrose or sucrose at concentrations of from about 0.3% to about 25% by weight. These solids may then be conveniently added to the drinking water by the poultry grower.

According to a further aspect of this invention there are provided compositions comprising poultry feed supplements or additives containing a compound of Formula I or Formula II above as an effective anticoccidial ingredient. In such compositions the anticoccidial compound is mixed with or dispersed in an orally ingestible carrier vehicle that is non-toxic to the poultry and compatible with the finished feedstuff, and that is preferably a nutritive carrier. These feed supplements contain a significantly higher percentage of coccidiostat drug than does the finished feed, and are mixed with or blended into the feedstuff before administration to the poultry. In order to assure uniform distribution of the coccidiostat in the finished feed, it is customary to employ an intermediate dilution step in which the supplement is blended with a portion of the final feed, and this "intermediate mix" is then added to the remainder of the feed with adequate mixing. The coccidiostat compounds described hereinabove may be formulated into feed supplement compositions containing from about 1.0% to about 30% by weight of drug. It is preferred in the industry to use from about 1–5 pounds of such a supplement per ton of feedstuff. It will, therefore, be appreciated that the preferred supplement concentration will depend to a large extent on the final use level desired. With the compounds of this invention, feed supplement compositions containing from about 2.0% to about 30% by weight of active ingredient are preferred.

Diluents or carrier vehicles that may be used in making the poultry feed supplements of this invention are solid orally ingestible poultry feed additives such as corn meal, distillers' dried grains, ground oyster shell, citrus meal fermentation residues, wheat shorts, wheat middlings, molasses solubles, corn gluten feed, soybean meal, dehulled soya flour, crushed limestone, fermentation mycelia, edible vegetable substances and the like. Solid nutritive carriers are preferred since the finished feed is benefitted thereby.

The compounds described herein may be employed as the sole coccidiostat being administered to poultry, or they may be administered to poultry together with one or more other anticoccidial agents which are primarily active against *E. tenella* and *E. necatrix*. Examples of such other coccidiostats are amprolium, nicarbazin, glycarbylamide, 3,5-dinitrobenzamide and 2-methyl-3,5-dinitrobenzamide. Thus, one of the objects and achievements of this invention is the provision of highly active broad spectrum anticoccidial compositions which comprise a 2-loweralkoxy-4-A-benzyl alcohol or benzylamine of Formula I or II above, and at least one other anticoccidial agent that is highly active against *E. tenella* and *E. necatrix*. In many cases the efficacy of such a combination is greater than would be expected from the activity of either coccidiostat alone.

The following examples are given for the purpose of illustration and not by way of limitation.

EXAMPLE 1

2-ethoxy-4-nitro benzyl alcohol 0.86 gram of sodium borohydride and 30 ml. of diethylene glycol dimethyl ether are placed in a 250 ml. flask equipped with stirrer, thermometer and reflux condenser. The mixture is warmed till all the solid dissolves and then cooled in an ice bath while 5.25 grams of 2-ethoxy-4-nitro benzoic acid is added slowly with stirring. The ice-cooling is continued while 1 gram of anhydrous aluminum chloride in 10 ml. of diethylene glycol dimethyl ether is added slowly with vigorous stirring. The resulting mixture is allowed to warm to room temperature and then heated at 75° C. for two hours. It is then cooled to about room temperature and 60 ml. of ice and 10 ml. of concentrated hydrochloric acid are added. The resulting solid precipitate is collected by filtration and dissolved in a minimum volume of ether. The resulting ether solution is washed with dilute sodium hydroxide, dried over sodium sulfate and concentrated to dryness to give yellow crystals of 2-ethoxy-4-nitro benzyl alcohol. On recrystallization from alcohol-water the product melts at 108–110° C.

2-ethoxy-4-nitro benzyl alcohol is fully active in curing coccidiosis in chickens due to *E. brunetti* when fed to the chickens at a concentration of 0.006% by weight in the feed.

When the above process is repeated using 2-methoxy-4-nitro benzoic acid as starting material, there is obtained 2-methoxy-4-nitro benzyl alcohol.

EXAMPLE 2

2-ethoxy-4-amino benzyl alcohol 1.97 grams (0.01 mole) of 2-ethoxy-4-nitro benzyl alcohol and 400 mg. of ruthenium on charcoal are added to 50 ml. of ethanol. The resulting solution is hydrogenated at room temperature and at a pressure of 40 p.s.i. After the theoretical amount of hydrogen is absorbed (0.03 mole) the hydrogenation is stopped and the solid catalyst removed by filtration. The filtrate is concentrated to dryness in vacuo to give 2-ethoxy-4-amino benzyl alcohol which may be purified by recrystallization from methanol-acetone.

EXAMPLE 3

2-methoxy-4-amino benzyl amine dihydrochloride

A mixture of 17.8 grams of 2-methoxy-4-nitro benzonitrile, 275 ml. of absolute alcohol, 100 ml. of liquid ammonia and 1 teaspoon of Raney nickel catalyst are placed in a bomb and hydrogenated at a pressure of 2000 p.s.i. and at a temperature of 75–85° C. After the required amount of hydrogen is absorbed, the mixture is removed from the bomb, cooled and filtered to remove insolubles. The filtrate is concentrated in vacuo to dryness. A solution of ethanolic hydrogen chloride is added to the residue. The resulting white solid is collected on a filter and washed with acetone. The solid is purified by dissolving in a minimum volume of methanol and crystallized by addition of acetone to the methanol solution. The resulting solid is substantially pure 2-methoxy-4-amino benzyl amine dihydrochloride.

2-ethoxy-4-amino benzyl amine dihydrochloride and 2-propoxy-4-amino benzyl amine dihydrochloride are obtained by repeating this experiment using as starting material 2-ethoxy-4-nitro benzonitrile and 2-propoxy-4-nitro benzonitrile, respectively.

2-methoxy-4-amino benzyl amine dihydrochloride is active against coccidiosis in chickens due to *E. brunetti* when administered to the infected chickens at a feed concentration of 0.006% by weight.

EXAMPLE 4

2-ethoxy-4-nitro benzyl amine

To a mixture of 2.9 grams of thionyl chloride and 300 mg. of calcium chloride in a 50 ml. flask there is slowly added with rapid stirring 3.94 grams of 2-ethoxy-4-nitro benzyl alcohol. During the addition the temperature of the reaction mixture is maintained below 35° C. When the addition is completed, the mixture is stirred for two hours at room temperature at the end of which time 15 ml. of ether and 2 grams of calcium carbonate are added. The solid is removed by filtration and the resulting filtrate concentrated to dryness in vacuo to give impure 2-ethoxy-4-nitro benzyl chloride.

4.3 grams of this 2-ethoxy-4-nitro benzyl chloride is added to 3.7 grams of potassium phthalimide in 20 ml. of dimethyl formamide. The resulting mixture is heated on a steam bath for one hour. 75 ml. of water is then added and the resulting mixture extracted with three 15 ml. portions of chloroform. The chloroform extracts are combined, washed successively with dilute sodium hydroxide and with water, then dried over magnesium sulfate. The drying agent is removed by filtration and the filtrate concentrated to dryness to give N-(2-ethoxy-4-nitro benzyl) phthalimide.

The phthalimide derivative obtained immediately above is dissolved in 25 ml. of ethanol and 2 ml. of 80% hydrazine hydrate are added to the ethanol solution. The mixture is stirred for 16 hours at room temperature at the end of which time 25 ml. of water is added and the mixture acidified to Congo red with hydrochloric acid. The resulting precipitate of phthalylhydrazide is removed by filtration and the filtrate concentrated in vacuo at a temperature of about 40° C. to a 10 ml. volume. This concentrate is made just basic with dilute aqueous sodium hydroxide and the solution extracted with 3 x 5 ml. of chloroform. The chloroform extracts are combined, dried over magnesium sulfate and then concentrated in vacuo to dryness to give 2-ethoxy-4-nitro benzyl amine.

2-methoxy-4-nitro benzyl amine is obtained by carrying out the foregoing example using as starting material 2-methoxy-4-nitro benzyl alcohol.

EXAMPLE 5

2-ethoxy-4-acetamido benzylacetate

To a solution of 1.67 g. of 2-ethoxy-4-amino benzyl alcohol in 10 ml. of pyridine is added 5 ml. of acetic anhydride. The solution is allowed to stand overnight at room temperature and then concentrated to half its volume at room temperature, and then diluted with water to precipitate 2-ethoxy-3-acetamido benzylacetate. The product is purified by recrystallizing from ethanol.

When 2-methoxy-4-amino benzyl alcohol is treated with an excess of propionic anhydride in pyridine at 35° C. for 15 hours, 2-methoxy-4-propionamido benzyl propionate is produced. It is issolated by the method described above for 2-ethoxy-4-acetamido benzylacetate.

EXAMPLE 6

2-methoxy-4-acetylamino benzylamine hydrochloride

To a stirred mixture of 2.25 g. of 2-methoxy-4-aminobenzylamine dihydrochloride in 50 ml. of acetone there is added 0.79 ml. of pyridine and 1.02 ml. of acetic anhydride. The mixture is stirred for two hours at room temperature and the resulting precipitate of 2-methoxy-4-acetylamino benzylamine hydrochloride is removed by filtration. The product is crystallized from 12 ml. of hot water to give 2-methoxy-4-acetylamino benzylamino hydrochloride, M.P. 293–294° C.

2-ethoxy-4-benzimido benzylamine hydrochloride is prepared by treating 2-ethoxy-4-amino benzylamine dihydrochloride at room temperature for three hours with benzoyl chloride in the presence of pyridine. When a large excess of benzoyl chloride is used and the reaction carried out at 90–100° C. for five hours, N-(2-ethoxy-4-benzamido-benzyl) benzamido is obtained.

EXAMPLE 7

2-ethoxy-4-nitrobenzyl acetate 1 ml. of acetic anhydride is added to a cold (0° C.) solution of 2.0 g. of 2-ethoxy-4-nitrobenzyl alcohol in 10 ml. of pyridine. The solution is allowed to stand at room temperature for 24 hours, and then poured into an ice-water mixture. The precipitated 2-ethoxy-4-nitrobenzyl acetate is filtered off and recrystallized from methanol to give substantially pure material.

EXAMPLE 8

N-(2-ethoxy-4-nitrobenzyl) acetamide 1 gram of 2-ethoxy-4-nitrobenzylamine is slowly added to 10 ml. of acetic anhydride with shaking and cooling in an ice-bath. The mixture is allowed to stand at room temperature for two hours and then heated on a steam bath for one-half hour. It is cooled to room temperature and poured into an ice-water mixture. The amide which precipitates is washed with water, then recrystallized from methanol to give N-(2-ethoxy-4-nitrobenzyl) acetamide.

EXAMPLE 9

2-ethoxy-4-dimethylamino benzyl alcohol 1.7 g. of 2-ethoxy-4-amino benzyl alcohol is mixed with 5 g. of sodium hydroxide and 30 g. of methyl iodide in 190 ml. of methanol. This reaction mixture is allowed to stand at 30° C. for two days. 5 g. of sodium hydroxide is added, and the mixture refluxed for 45 minutes. The reaction mass is concentrated in vacuo to remove the alcohol, and the residue dissolved in 30 ml. of warm water. The solution is cooled to precipitate 2-ethoxy-4-dimethylamino benzyl alcohol. The product is purified by recrystallizing from methanol.

What is claimed:

1. A member of the class consisting of compounds having the formula:

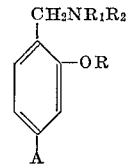

wherein R represents lower alkyl; A is $NHR_4$; $R_1$ and $R_2$ are hydrogen, or lower alkyl; and $R_4$ is hydrogen or lower alkyl.

2. A compound of the class consisting of 2-loweralkoxy-4-amino benzylamine, and non-toxic acid addition salts thereof.

3. 2-methoxy-4-amino benzylamine dihydrochloride.

4. 2-ethoxy-4-amino benzylamine dihydrochloride.

References Cited

UNITED STATES PATENTS

| | | | |
|---|---|---|---|
| 2,401,957 | 6/1946 | Pedersen et al. | 260—570.9 X |
| 2,449,036 | 9/1948 | Grunfeld | 260—570.9 X |
| 2,474,819 | 7/1949 | Burckhalter et al. | 260—570.9 X |
| 3,166,562 | 1/1965 | Leditschke et al. | 260—570.8 X |
| 3,336,308 | 8/1967 | Keck | 260—570.9 X |
| 3,360,562 | 12/1967 | Carabateas | 260—570.9 X |
| 3,372,196 | 3/1968 | Engelhardt | 260—570.8 |
| 3,383,415 | 5/1968 | Carabateas | 260—570.9 |

FOREIGN PATENTS 613,286  1/1961  Canada.

OTHER REFERENCES

Maffei: "Chemical Abstracts," vol. 23, p. 3929 (1929).
Kuffner et al.: "Chemical Abstracts," vol. 55, pp. 14,492–6 (1961).
Iyer et al.: "Chemical Abstracts," vol. 52, pp. 4645–6 (1958).
Iyer et al.: "Jour. of Scientific and Industrial Research (India)," vol. 16C, pp. 157–61 (1957).

ROBERT V. HINES, Primary Examiner

U.S. Cl. X.R.

260—511, 612, 575, 574, 326, 465, 482, 484, 558, 562, 501.17, 501.2; 99—4; 424—311, 324, 330